US012750266B2

(12) United States Patent
Hu et al.

(10) Patent No.: US 12,750,266 B2
(45) Date of Patent: Sep. 29, 2026

(54) OPTIMIZATION OF DISTRIBUTED-TONE RESOURCE UNIT PILOT TONE DESIGNS IN WIRELESS COMMUNICATIONS

(71) Applicant: MediaTek Inc., Hsinchu City (TW)

(72) Inventors: Shengquan Hu, San Jose, CA (US); Ching-Chia Cheng, Hsinchu City (TW); Hung-Tao Hsieh, Hsinchu City (TW); Jianhan Liu, San Jose, CA (US); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 291 days.

(21) Appl. No.: 18/511,682

(22) Filed: Nov. 16, 2023

(65) Prior Publication Data

US 2024/0171435 A1 May 23, 2024

Related U.S. Application Data

(60) Provisional application No. 63/384,238, filed on Nov. 18, 2022.

(51) Int. Cl.
*H04L 27/26* (2006.01)

(52) U.S. Cl.
CPC .................................. *H04L 27/261* (2013.01)

(58) Field of Classification Search
None
See application file for complete search history.

(56) References Cited

U.S. PATENT DOCUMENTS

| | | | | |
|---|---|---|---|---|
| 11,838,227 B2* | 12/2023 | Yang | H04L 5/0044 | |
| 12,184,568 B2* | 12/2024 | Yang | H04L 5/0044 | |
| 12,452,010 B2* | 10/2025 | Hu | H04L 5/0007 | |
| 2015/0365195 A1* | 12/2015 | Yang | H04L 1/06 | 375/295 |
| 2016/0142187 A1* | 5/2016 | Yang | H04L 5/0046 | 370/328 |
| 2016/0226638 A1* | 8/2016 | Azizi | H04L 27/362 | |
| 2016/0302200 A1* | 10/2016 | Yang | H04L 1/0041 | |
| 2017/0034829 A1* | 2/2017 | Yang | H04L 5/0048 | |
| 2017/0041825 A1* | 2/2017 | Yang | H04W 28/065 | |
| 2019/0109684 A1* | 4/2019 | Chen | H04L 5/003 | |
| 2021/0409249 A1* | 12/2021 | Chen | H04L 1/0026 | |
| 2022/0038250 A1* | 2/2022 | Hu | H04L 5/0048 | |
| 2022/0140988 A1* | 5/2022 | Hu | H04L 5/0046 | 370/329 |
| 2022/0263624 A1* | 8/2022 | Hu | H04L 5/0007 | |
| 2022/0329397 A1* | 10/2022 | Hu | H04L 1/08 | |

(Continued)

OTHER PUBLICATIONS

European Patent Office, Extended European Search Report in European Patent Application No. 23210528.9-1203, Apr. 17, 2024.

*Primary Examiner* — Christopher T Wyllie
(74) *Attorney, Agent, or Firm* — Andy M. Han; Han IP PLLC

(57) ABSTRACT

Techniques pertaining to optimization of distributed-tone resource unit (RU) pilot tone designs in wireless communications are described. An apparatus (e.g., station (STA)) generates a distributed-tone RU (dRU) with a respective position of each of one or more pilot tones shifted with a respective position of each of one or more other pilot tones kept unchanged. The apparatus then performs a wireless communication in a 20 MHz or 40 MHz bandwidth with the dRU.

4 Claims, 14 Drawing Sheets

(56) References Cited

U.S. PATENT DOCUMENTS

| | | | | |
|---|---|---|---|---|
| 2022/0345263 | A1* | 10/2022 | Hu | H04L 5/0041 |
| 2022/0416988 | A1* | 12/2022 | Cao | H04B 1/69 |
| 2023/0048884 | A1* | 2/2023 | Yang | H04L 5/0044 |
| 2023/0104295 | A1* | 4/2023 | Yang | H04L 5/0041 370/329 |
| 2024/0129081 | A1* | 4/2024 | Hu | H04L 5/0094 |
| 2024/0171435 | A1* | 5/2024 | Hu | H04L 27/261 |
| 2024/0297811 | A1* | 9/2024 | Chen | H04L 25/0226 |
| 2025/0125919 | A1* | 4/2025 | Yang | H04L 5/0044 |
| 2026/0012309 | A1* | 1/2026 | Hu | H04L 5/0007 |

* cited by examiner

400

(A)

| | Pilot Tone Indices | |
|---|---|---|
| 1st dRU26 | -111 | 24 |
| 2nd dRU26 | -89 | 46 |
| ...... | -100 | 35 |
| | -78 | 57 |
| | -67 | 68 |
| | -56 | 79 |
| | -34 | 101 |
| | -45 | 90 |
| 9th dRU26 | -23 | 112 |

Ratio = Pilot Tone Spacing / Null Tone Spacing = 135 / 32 = 4.21875

(B)

| | Pilot Tone Indices | |
|---|---|---|
| 1st dRU26 | -102 | 15 |
| 2nd dRU26 | -80 | 37 |
| ...... | -91 | 26 |
| | -69 | 48 |
| | -58 | 59 |
| | -47 | 70 |
| | -25 | 92 |
| | -36 | 81 |
| 9th dRU26 | -14 | 103 |

Ratio = Pilot Tone Spacing / Null Tone Spacing = 117 / 32 = 3.65625

(C)

| | Pilot Tone Indices | |
|---|---|---|
| 1st dRU26 | -120 | 24 |
| 2nd dRU26 | -98 | 46 |
| ...... | -109 | 35 |
| | -87 | 57 |
| | -76 | 68 |
| | -65 | 79 |
| | -43 | 101 |
| | -54 | 90 |
| 9th dRU26 | -32 | 112 |

Ratio = Pilot Tone Spacing / Null Tone Spacing = 144 / 32 = 4.5

FIG. 4

600

(A)

| | | | | |
|---|---|---|---|---|
| 1st dRU52 | -111 | -89 | 24 | 46 |
| 2nd dRU52 | -100 | -78 | 35 | 57 |
| 3rd dRU52 | -56 | -34 | 79 | 101 |
| 4th dRU52 | -45 | -23 | 90 | 112 |

PILOT TONE INDICES (B)

| | | | | |
|---|---|---|---|---|
| 1st dRU52 | -102 | -80 | 15 | 37 |
| 2nd dRU52 | -91 | -69 | 26 | 48 |
| 3rd dRU52 | -47 | -25 | 70 | 92 |
| 4th dRU52 | -36 | -14 | 81 | 103 |

PILOT TONE INDICES (C)

| | | | | |
|---|---|---|---|---|
| 1st dRU52 | -120 | -98 | 24 | 46 |
| 2nd dRU52 | -109 | -87 | 35 | 57 |
| 3rd dRU52 | -65 | -43 | 79 | 101 |
| 4th dRU52 | -54 | -32 | 90 | 112 |

PILOT TONE INDICES

| | (A) | (B) | (C) |
|---|---|---|---|
| PILOT TONE SPACING (RELATIVE TO THE 1ST PILOT TONE): | 22 | 117 | 139 |
| RATION = PILOT TONE SPACING / NULL TONE SPACING: | 0.6875 | 3.65625 | 4.34375 |

FIG. 6

700

(A1)

| | | | | |
|---|---|---|---|---|
| 1st dRU106 | -111 | -78 | 24 | 57 |
| 2nd dRU106 | -56 | -23 | 79 | 112 |

PILOT TONE INDICES (B1)

| | | | | |
|---|---|---|---|---|
| 1st dRU106 | -102 | -69 | 15 | 48 |
| 2nd dRU106 | -47 | -14 | 70 | 103 |

PILOT TONE INDICES (C1)

| | | | | |
|---|---|---|---|---|
| 1st dRU106 | -120 | -87 | 24 | 57 |
| 2nd dRU106 | -65 | -32 | 79 | 112 |

PILOT TONE INDICES (A2)

| | | | |
|---|---|---|---|
| -100 | -89 | 35 | 46 |
| -45 | -34 | 79 | 112 |

(B2)

| | | | |
|---|---|---|---|
| -102 | -69 | 15 | 48 |
| -47 | -14 | 70 | 103 |

(C2)

| | | | |
|---|---|---|---|
| -120 | -87 | 24 | 57 |
| -65 | -32 | 79 | 112 |

(A3)

| | | | |
|---|---|---|---|
| -111 | -89 | 35 | 57 |
| -56 | -34 | 90 | 112 |

(B3)

| | | | |
|---|---|---|---|
| -102 | -80 | 26 | 48 |
| -47 | -25 | 81 | 103 |

(C3)

| | | | |
|---|---|---|---|
| -120 | -98 | 35 | 57 |
| -65 | -43 | 90 | 112 |

(A4)

| | | | |
|---|---|---|---|
| -100 | -78 | 24 | 46 |
| -45 | -23 | 79 | 101 |

(B4)

| | | | |
|---|---|---|---|
| -91 | -69 | 15 | 37 |
| -36 | -14 | 70 | 92 |

(C4)

| | | | |
|---|---|---|---|
| -109 | -87 | 24 | 46 |
| -54 | -32 | 79 | 101 |

(A5)

4 PILOT TONES FROM ONE OF CORRESPONDING DRU52 PILOT TONES (B5)

4 PILOT TONES FROM ONE OF CORRESPONDING DRU52 PILOT TONES (C5)

4 PILOT TONES FROM ONE OF CORRESPONDING DRU52 PILOT TONES

FIG. 7

| | Original 1st Pilot Tone | Original 2nd Pilot Tone |
|---|---|---|
| 1st dRU | -224 | 28 |
| 2nd dRU | -125 | 127 |
| | -202 | 50 |
| | -103 | 149 |
| | -81 | 171 |
| | -114 | 138 |
| | -213 | 39 |
| | -92 | 160 |
| | -191 | 61 |
| | -169 | 83 |
| | -70 | 182 |
| | -147 | 105 |
| | -48 | 204 |
| | -180 | 72 |
| | -59 | 193 |
| | -158 | 94 |
| | -37 | 215 |
| 18th dRU26 | -136 | 116 |

(B)

| Original 1st Pilot Tone | Right-Shifted 2nd Pilot Tone |
|---|---|
| -224 | 46 |
| -125 | 145 |
| -202 | 68 |
| -103 | 167 |
| -81 | 189 |
| -114 | 156 |
| -213 | 57 |
| -92 | 178 |
| -191 | 79 |
| -169 | 101 |
| -70 | 200 |
| -147 | 123 |
| -48 | 222 |
| -180 | 90 |
| -59 | 211 |
| -158 | 112 |
| -37 | 233 |
| -136 | 134 |

900

(A)

| | | |
|---|---|---|
| 1st dRU26 | -206 | 28 |
| 2nd dRU26 | -107 | 127 |
| | -184 | 50 |
| | -85 | 149 |
| | -63 | 171 |
| | -96 | 138 |
| | -195 | 39 |
| | -74 | 160 |
| | -173 | 61 |
| | -151 | 83 |
| | -52 | 182 |
| | -129 | 105 |
| | -30 | 204 |
| | -162 | 72 |
| | -41 | 193 |
| | -140 | 94 |
| | -19 | 215 |
| 18th dRU26 | -118 | 116 |

PILOT TONE INDICES

RATIO = PILOT TONE SPACING / NULL TONE SPACING = 234 / 32 = 7.3125

(B)

| | | |
|---|---|---|
| 1st dRU26 | -224 | 46 |
| 2nd dRU26 | -125 | 145 |
| | -202 | 68 |
| | -103 | 167 |
| | -81 | 189 |
| | -114 | 156 |
| | -213 | 57 |
| | -92 | 178 |
| | -191 | 79 |
| | -169 | 101 |
| | -70 | 200 |
| | -147 | 123 |
| | -48 | 222 |
| | -180 | 90 |
| | -59 | 211 |
| | -158 | 112 |
| | -37 | 233 |
| 18th dRU26 | -136 | 134 |

PILOT TONE INDICES

RATIO = PILOT TONE SPACING / NULL TONE SPACING = 270 / 32 = 8.4375

FIG. 9

1100

(A)

| | | | | |
|---|---|---|---|---|
| 1st dRU52 | -206 | -107 | 28 | 127 |
| 2nd dRU52 | -184 | -85 | 50 | 149 |
| 3rd dRU52 | -195 | -96 | 39 | 138 |
| 4th dRU52 | -173 | -74 | 61 | 160 |
| 5th dRU52 | -151 | -52 | 83 | 182 |
| 6th dRU52 | -129 | -30 | 105 | 204 |
| 7th dRU52 | -140 | -41 | 94 | 193 |
| 8th dRU52 | -118 | -19 | 116 | 215 |

PILOT TONE INDICES (B)

| | | | |
|---|---|---|---|
| -224 | -125 | 46 | 145 |
| -202 | -103 | 68 | 167 |
| -213 | -114 | 57 | 156 |
| -191 | -92 | 79 | 178 |
| -169 | -70 | 101 | 200 |
| -147 | -48 | 123 | 222 |
| -158 | -59 | 112 | 211 |
| -136 | -37 | 134 | 233 |

| | | | |
|---|---|---|---|
| PILOT TONE SPACING (RELATIVE TO THE 1ST PILOT TONE): | 99 | 270 | 369 |
| RATION = PILOT TONE SPACING / NULL TONE SPACING: | 3.09375 | 8.4375 | 11.53125 |

FIG. 11

1200

(A1)

| | | | | |
|---|---|---|---|---|
| 1st dRU106 | -184 | -107 | 50 | 127 |
| 2nd dRU106 | -173 | -96 | 61 | 138 |
| 3rd dRU106 | -129 | -52 | 105 | 182 |
| 4th dRU106 | -118 | -41 | 116 | 193 |

(B1)

| | | | | |
|---|---|---|---|---|
| 1st dRU106 | -202 | -125 | 68 | 145 |
| 2nd dRU106 | -191 | -114 | 79 | 156 |
| 3rd dRU106 | -147 | -70 | 123 | 200 |
| 4th dRU106 | -136 | -59 | 134 | 211 |

(A2)

| | | | | |
|---|---|---|---|---|
| 1st dRU106 | -206 | -85 | 28 | 149 |
| 2nd dRU106 | -195 | -74 | 39 | 160 |
| 3rd dRU106 | -151 | -30 | 83 | 204 |
| 4th dRU106 | -140 | -19 | 94 | 215 |

(B2)

| | | | | |
|---|---|---|---|---|
| 1st dRU106 | -224 | -103 | 46 | 167 |
| 2nd dRU106 | -213 | -92 | 57 | 178 |
| 3rd dRU106 | -169 | -48 | 101 | 222 |
| 4th dRU106 | -158 | -37 | 112 | 233 |

(A3)

4 PILOT TONES FROM ONE OF CORRESPONDING DRU52 PILOT TONES (B3)

4 PILOT TONES FROM ONE OF CORRESPONDING DRU52 PILOT TONES

FIG. 12

OPTIMIZATION OF DISTRIBUTED-TONE RESOURCE UNIT PILOT TONE DESIGNS IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/384,238, filed 18 Nov. 2022, the content of which herein being incorporated by reference in its entirety.

TECHNICAL FIELD

The present disclosure is generally related to wireless communications and, more particularly, to optimization of distributed-tone resource unit (RU) pilot tone designs in wireless communications.

BACKGROUND

Unless otherwise indicated herein, approaches described in this section are not prior art to the claims listed below and are not admitted as prior art by inclusion in this section.

In wireless communications such as Wi-Fi (or WiFi) in accordance with the Institute of Electrical and Electronics Engineers (IEEE) 802.11 standards, distributed-tone RU (dRU) has been proposed to boost transmission power for uplink (UL) trigger-based (TB) physical-layer protocol data unit (PPDU) in 6 GHz low-power indoor (LPI) systems. Support of up to two spatial streams (2ss) has also been considered for dRU transmission in the 6 GHz frequency band. The second transmit path needs to perform cyclic shift delay (CSD), which may be implemented in frequency domain by phase rotation tone-by-tone. However, there could be a pilot nulling problem when the ratio of pilot tone spacing vis-à-vis CSD periodicity is close to an integer number. That is, the pilot nulling issue may become serious for dRUs of smaller sizes, such as 26-tone dRU (dRU26) and 52-tone dRU (dRU52) which only have two or four pilot tones, respectively. Therefore, there is a need for a solution of optimization of dRU pilot tone designs in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to optimization of dRU pilot tone designs in wireless communications. Under various proposed schemes in accordance with the present disclosure, pilot tone locations for dRUs on bandwidth 20 MHz and 40 MHz may be optimized so as to avoid or otherwise minimize the pilot nulling problem.

In one aspect, a method may involve generating a dRU with a respective position of each of one or more pilot tones shifted to right or left and with a respective position of each of one or more other pilot tones kept unchanged. The method may also involve performing a wireless communication in a 20 MHz or 40 MHz bandwidth with the dRU.

In another aspect, an apparatus may include a transceiver configured to communicate wirelessly and a processor coupled to the transceiver. The processor may generate a dRU with a respective position of each of one or more pilot tones shifted to right or left and with a respective position of each of one or more other pilot tones kept unchanged. The processor may also perform a wireless communication in a 20 MHz or 40 MHz bandwidth with the dRU.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IOT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 4 is a diagram of an example scenario under a proposed scheme in accordance with the present disclosure.

FIG. 6 is a diagram of an example scenario under a proposed scheme in accordance with the present disclosure.

FIG. 7 is a diagram of an example scenario under a proposed scheme in accordance with the present disclosure.

FIG. 9 is a diagram of an example scenario under a proposed scheme in accordance with the present disclosure.

FIG. 11 is a diagram of an example scenario under a proposed scheme in accordance with the present disclosure.

FIG. 12 is a diagram of an example scenario under a proposed scheme in accordance with the present disclosure.

DETAILED DESCRIPTION OF PREFERRED EMBODIMENTS

Figure 1:
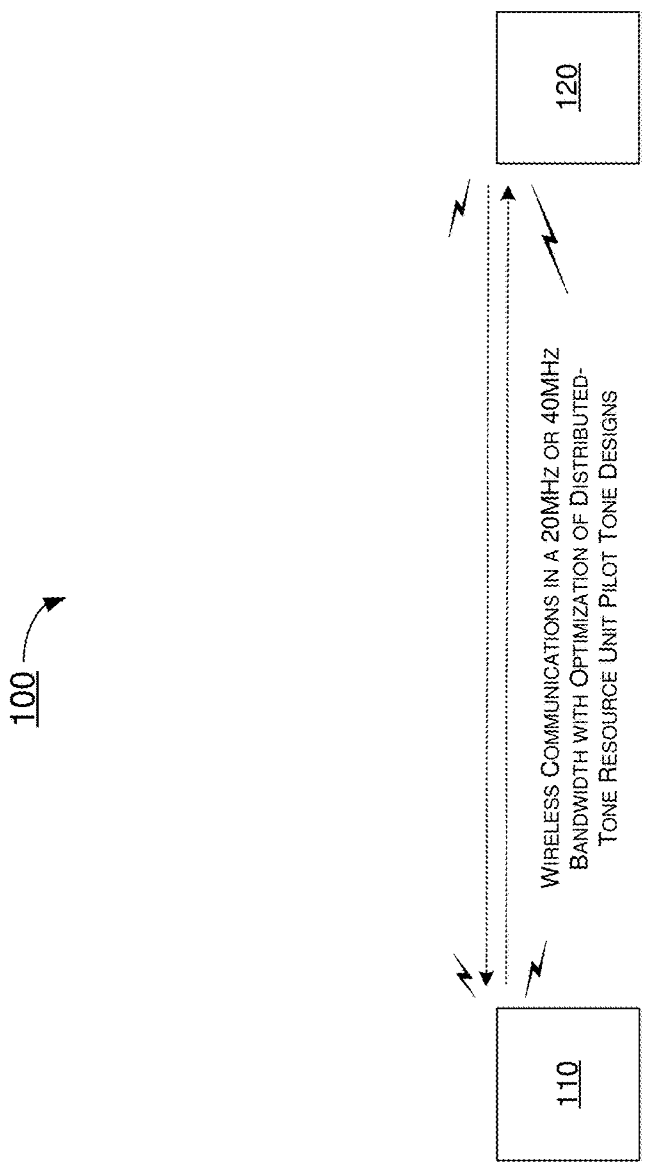
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to optimization of dRU pilot tone designs in wireless communications. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, a 26-tone distributed-tone RU may be interchangeably denoted as dRU26 (or iRU26), a 52-tone distributed-tone RU may be interchangeably denoted as dRU52 (or iRU52), a 106-tone distributed-tone RU may be interchangeably denoted as dRU106 (or iRU106), a 242-tone distributed-tone RU may be interchangeably denoted as dRU242 (or iRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on. Furthermore, an aggregate (26+52)-tone distributed-tone MRU (dMRU) may be interchangeably denoted as dMRU132, and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M.

FIG. 1 illustrates an example network environment 100 in which various solutions and schemes in accordance with the present disclosure may be implemented. FIG. 2~FIG. 14 illustrate examples of implementation of various proposed schemes in network environment 100 in accordance with the present disclosure. The following description of various proposed schemes is provided with reference to FIG. 1~FIG. 14.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11be and future-developed standards). Each of STA 110 and STA 120 may be configured to communicate with each other by utilizing the optimization of dRU pilot tone designs in wireless communications in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
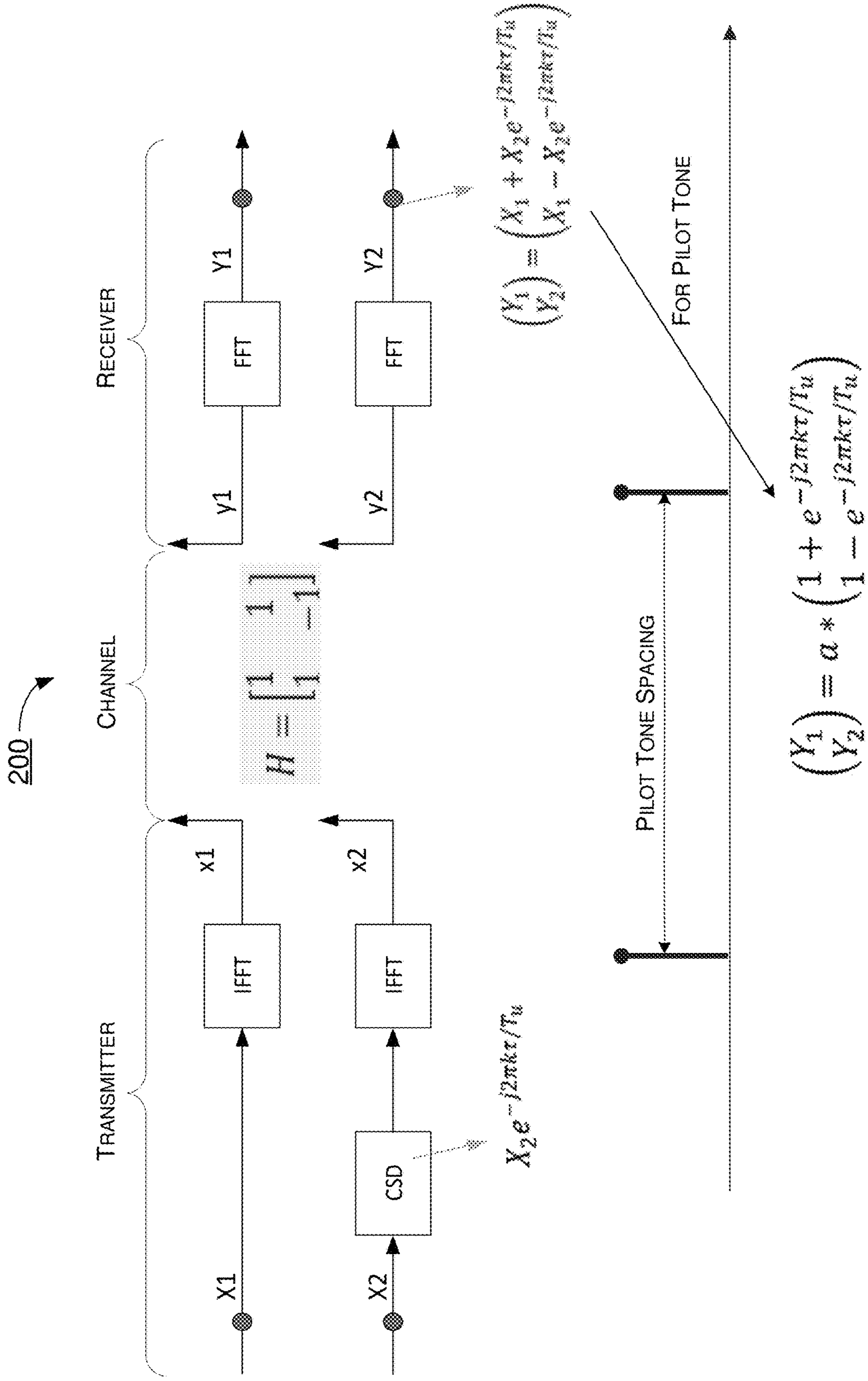
FIG. 2 is a diagram of an example scenario under a proposed scheme in accordance with the present disclosure.

FIG. 2 illustrates an example scenario 200 with respect to pilot nulling. Referring to FIG. 2, it may be assumed that pilot tone spacing=γ*null spacing, where the null spacing (or CSD nulling periodicity)=32 tones (or with the definition of the ratio γ=pilot tone spacing/null spacing). In case that γ is an integer (e.g., γ=1, 2, 3, . . . ), then it is possible that both pilot tones of dRU26 may be "nulled" in one receiving (Rx) chain. To avoid such pilot nulling issue, under various proposed schemes in accordance with the present disclosure, the pilot tones may be selected so that γ (the ratio of pilot tone spacing/null spacing) is close to a non-integer real number of x.5, where x is an integer.

Under the proposed schemes in accordance with the present disclosure with respect to dRU pilot tone design optimization, the target of dRU pilot tone optimization is to achieve the ratio of pilot tone spacing versus CSD nulling spacing (or CSD periodicity, such as 32 subcarriers) close to the non-integer real number of x.5 as much as possible while still meeting certain conditions. Such conditions may include: (1) still preserving dRU pilot tone hierarchical structure; and (2) maximizing the minimum distance of overall pilot tones with the minimum distance between any two pilots being greater than or equal to 11 tones (≥11 tones). For BW20, the dRU26 uniformly distributes the tones over the entire bandwidth with the tone separation $N_p$=9. The dRU26 pilot tones of BW20 may be optimized by either shifting one of the pilot tone positions by n*9 (with n being an integer and n≥1, e.g., n=1, 2, . . . ) to the right or left while keeping another pilot tone position without change or, alternatively, shifting both pilot tone positions by n*9 (with n being an integer and n≥1, e.g., n=1, 2, . . . ) to the right and/or left.

Figure 3:
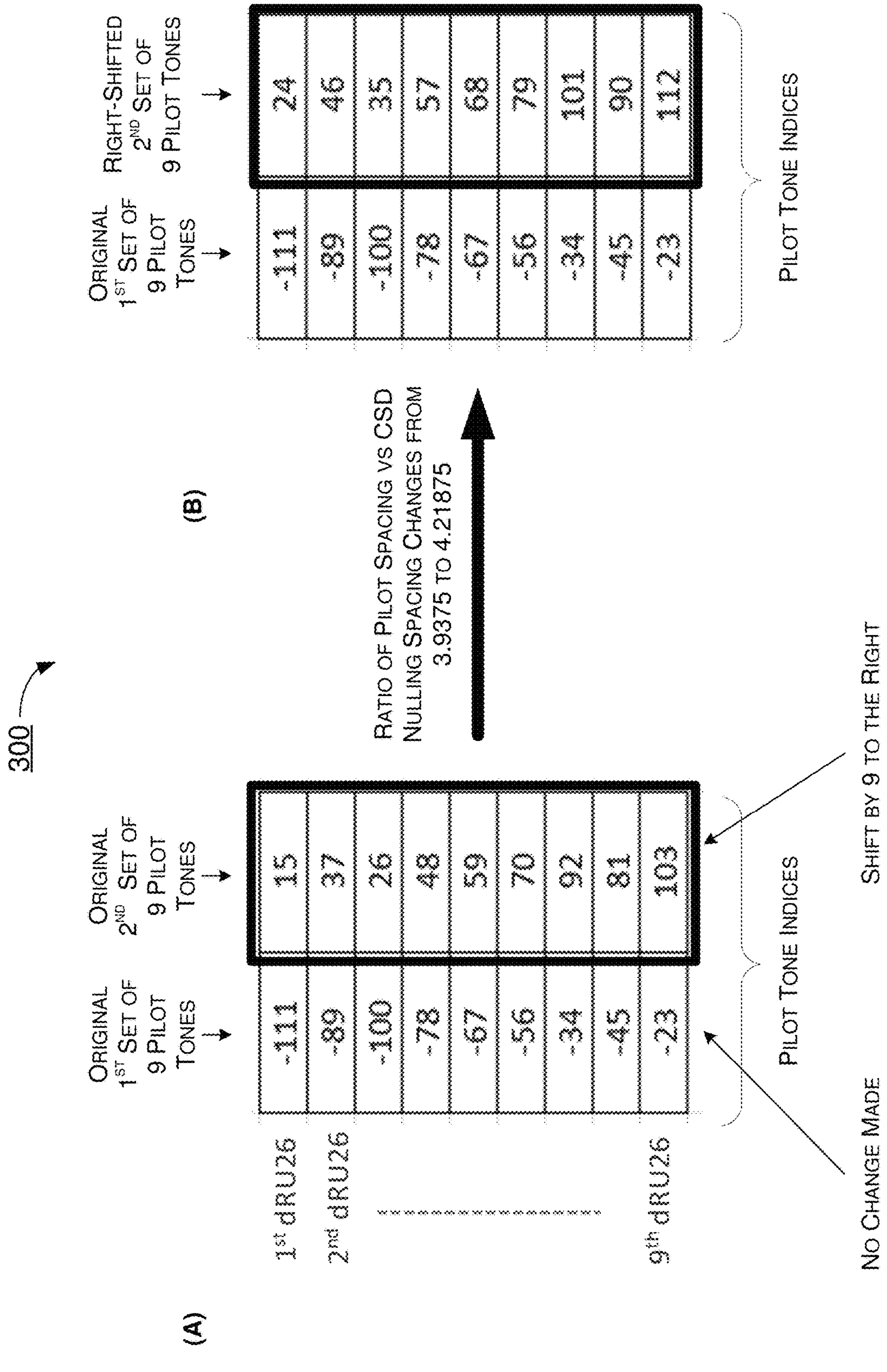
FIG. 3 is a diagram of an example scenario under a proposed scheme in accordance with the present disclosure.

FIG. 3 illustrates an example scenario 300 under a proposed scheme in accordance with the present disclosure. In each of part (A) and part (B) of FIG. 3, each of left column and right column lists the indices of nine pilot tones of dRU26s on BW20. In scenario 300, the pilot tones of the left column may be kept unchanged while the pilot tones of the right column may be shifted to the right by 9, with part (A) of FIG. 3 showing the original indices of the pilot tones and part (B) of FIG. 3 showing the pilot tones of the right column being shifted to the right by 9. As a result, the ratio of pilot tone spacing versus CSD nulling spacing may change from 3.9375 to 4.21875.

FIG. 4 illustrates an example scenario 400 under a proposed scheme in accordance with the present disclosure. Scenario 400 may pertain to pilot tone optimization for dRU26 on BW20. Part (A) of FIG. 4 shows a first option (Option-1) in which a first pilot tone on the left side of each of nine dRU26s may be kept unchanged while a second pilot tone on the right side of each of the nine dRU26s may be shifted to the right by 9 (as in scenario 200). The resulting ratio of pilot tone spacing/null spacing=135/32=4.21875. Part (B) of FIG. 4 shows a second option (Option-2) in which the second pilot tone on the right side of each of nine dRU26s may be kept unchanged while the first pilot tone on the left side of each of the nine dRU26s may be shifted to the right by 9, thereby resulting in the first pilot tones on the left side being further away from the edge/edge tones. The resulting ratio of pilot tone spacing/null spacing=117/32=3.65625. Part (C) of FIG. 4 shows a third option (Option-3) in which the first pilot tone on the left side of each of nine dRU26s may be shifted to the left by 9 while the second pilot tone on the right side of each of the nine dRU26s may be shifted to the right by 9. The resulting ratio of pilot tone spacing/null spacing=144/32=4.5.

Figure 5:
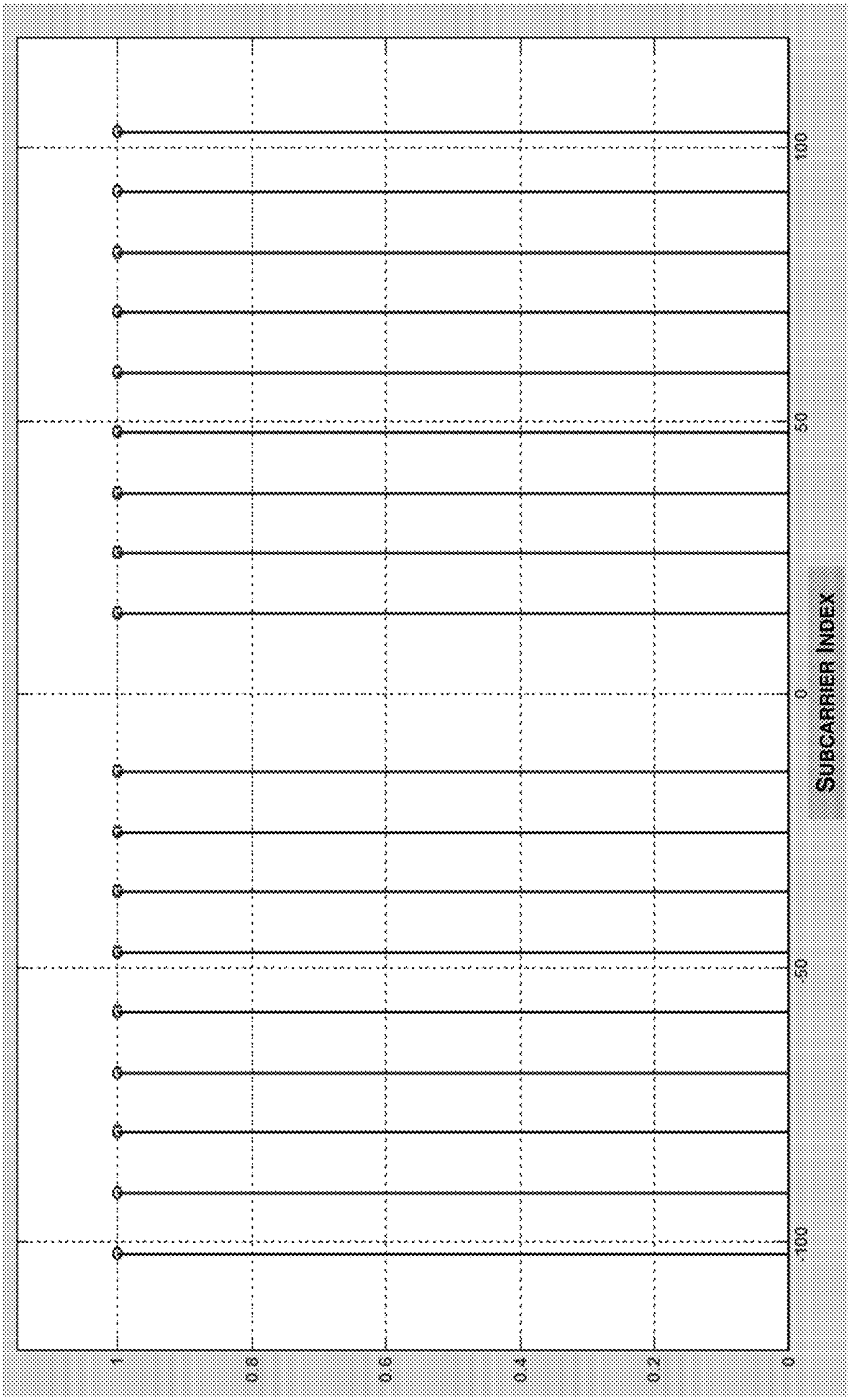
FIG. 5 is a diagram of an example simulation under a proposed scheme in accordance with the present disclosure.

FIG. 5 illustrates an example simulation 500 of overall pilot tones for dRU on BW20. Referring to FIG. 5, the minimum pilot tone separation may be 11 tones with perfect uniform distribution.

FIG. 6 illustrates an example scenario 600 under a proposed scheme in accordance with the present disclosure. Scenario 600 may pertain to pilot tone optimization for dRU52 on BW20. Part (A) of FIG. 6 shows a first option (Option-1) in which the two pilot tones (first and second pilot tones) on the left side of each of four dRU52s may be kept unchanged while the two pilot tones (third and fourth pilot tones) on the right side of each of the four dRU52s may be shifted to the right by 9. Part (B) of FIG. 6 shows a second option (Option-2) in which the two pilot tones (first and second pilot tones) on the left side of each of four dRU52s may be shifted to the right by 9 while the two pilot tones (third and fourth pilot tones) on the right side of each of the four dRU52s may be kept unchanged. Part (C) of FIG. 6 shows a third option (Option-3) in which the two pilot tones (first and second pilot tones) on the left side of each of four dRU52s may be shifted to the left by 9 while the two pilot tones (third and fourth pilot tones) on the right side of each of the four dRU52s may be shifted to the right by 9. Among the three options, Option-2 may be preferred given that the first pilot tone on the left side of each of the four dRUs may end up being further away from the edge/edge tones with the rightward shift. Moreover, in Option-2, each of the second, third and fourth pilot tones may end up having a pilot tone spacing of 22, 117 and 139 from the first pilot tone, respectively. The corresponding ratio of pilot tone spacing/null spacing=0.6875, 3.65625 and 4.34375, respectively. Notably, for a regular RU52 (rRU52), the ratio of pilot tone spacing/null spacing=[0.4375, 0.8125, 1.25].

FIG. 7 illustrates an example scenario 700 under a proposed scheme in accordance with the present disclosure. Scenario 700 may pertain to pilot tone optimization for dRU106 on BW20. Parts (A1), (A2), (A3) and (A4) of FIG. 7 shows first, second, third and fourth variations of a first option (Option-1a, Option-1b, Option-1c and Option-1d) in which each of the first, second, third and fourth pilot tones of each of two dRU106s may be kept unchanged or shifted to the left or right by a respective number of tones. Parts (B1), (B2), (B3) and (B4) of FIG. 7 shows first, second, third and fourth variations of a second option (Option-2a, Option-2b, Option-2c and Option-2d) in which each of the first, second, third and fourth pilot tones of each of two dRU106s may be kept unchanged or shifted to the left or right by a respective number of tones. Parts (C1), (C2), (C3) and (C4) of FIG. 7 shows first, second, third and fourth variations of a third option (Option-3a, Option-3b, Option-3c and Option-3d) in which each of the first, second, third and fourth pilot tones of each of two dRU106s may be kept unchanged or shifted to the left or right by a respective number of tones.

Under the proposed schemes in accordance with the present disclosure with respect to dRU pilot tone design optimization, the target of dRU pilot tone optimization is to achieve the ratio of pilot tone spacing versus CSD null spacing (or CSD periodicity, such as 32 subcarriers) being close to x.5 as much as possible while: (1) still preserving dRU pilot tone hierarchical structure; and (2) maximizing the minimum distance of overall pilot tones and minimum distance between any two pilot tones (e.g., ≥11 tones). For BW40, the dRU26 uniformly distributes the tones over the entire bandwidth with the tone separation $N_p$=18. Accordingly, the dRU26 pilot tone design may be optimized by either shifting one of the pilot tone positions by n*18 (with n being an integer and n≥1, e.g., n=1, 2, . . . ) to the right or left while keeping another pilot tone position without change or, alternatively, shifting both pilot tone positions by n*18 (with n being an integer and n≥1, e.g., n=1, 2, . . . ) to the right and/or left.

Figure 8:
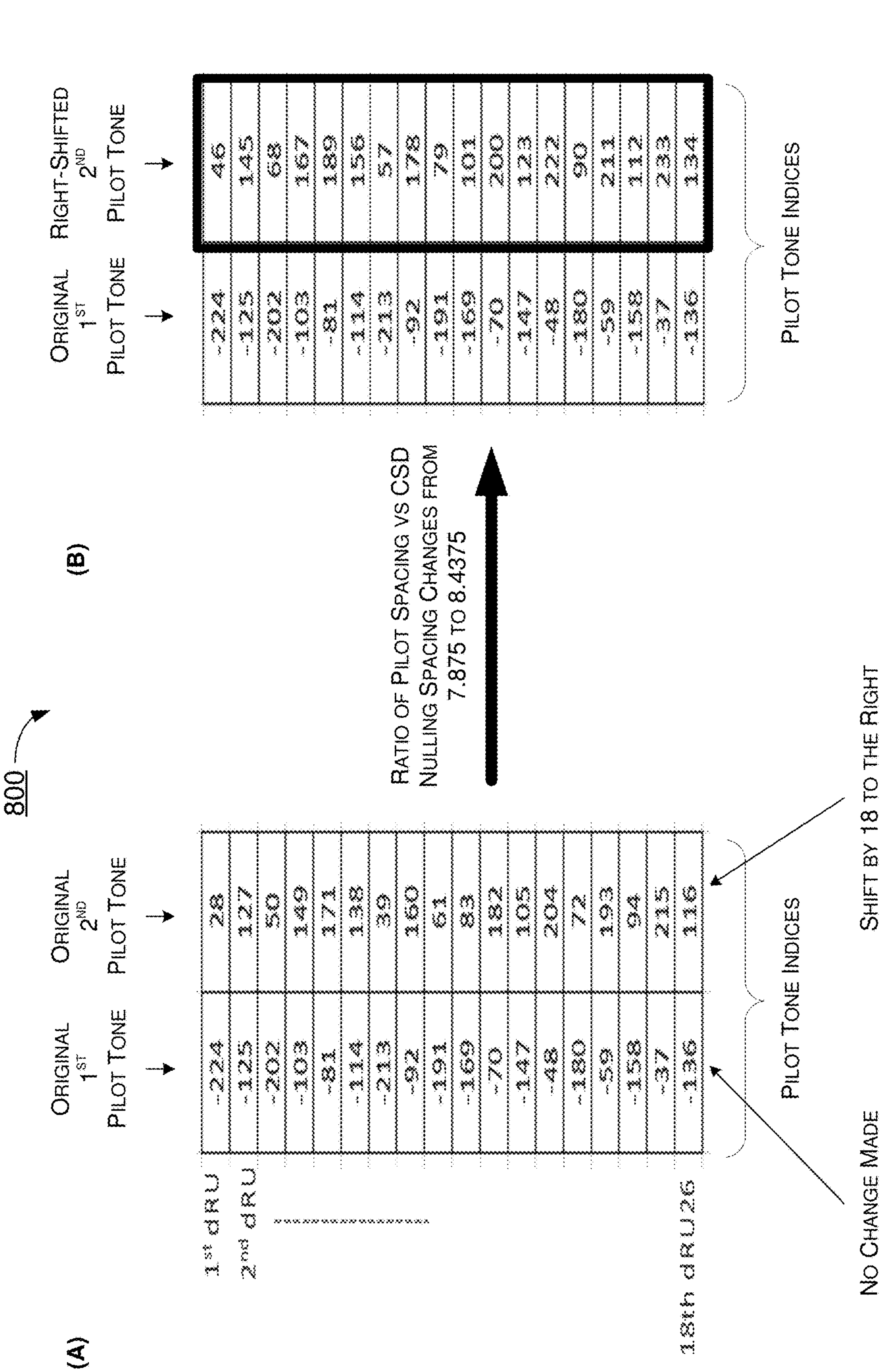
FIG. 8 is a diagram of an example scenario under a proposed scheme in accordance with the present disclosure.

FIG. 8 illustrates an example scenario 800 under a proposed scheme in accordance with the present disclosure. Scenario 800 may pertain to pilot tone optimization for dRU26 on BW40. The ratio of pilot tone spacing versus CSD nulling spacing is 252/32=7.875, which is close to the integer number 8 for dRU26. In each of part (A) and part (B) of FIG. 8, each of left column and right column lists the indices of pilot tones of eighteen dRU26s on BW40. In scenario 800, the pilot tones of the left column may be kept unchanged while the pilot tones of the right column may be shifted to the right by 18, with part (A) of FIG. 8 showing the original indices of the pilot tones and part (B) of FIG. 8 showing the pilot tones of the right column being shifted to the right by 18. As a result, the ratio of pilot tone spacing versus CSD nulling spacing may change from 7.875 to 8.4375.

FIG. 9 illustrates an example scenario 900 under a proposed scheme in accordance with the present disclosure. Scenario 900 may pertain to pilot tone optimization for dRU26 on BW40. Part (A) of FIG. 9 shows a first option (Option-1) in which a first pilot tone on the left side of each of eighteen dRU26s may be shifted to the right by 18 while a second pilot tone on the right side of each of the eighteen dRU26s may be kept the same. The resulting ratio of pilot tone spacing/null spacing=234/32=7.3125. Part (B) of FIG. 9 shows a second option (Option-2) in which the first pilot tone on the left side of each of eighteen dRU26s may be kept unchanged while the second pilot tone on the right side of each of the eighteen dRU26s may be shifted to the right by 18. The resulting ratio of pilot tone spacing/null spacing=270/32=8.4375.

Figure 10:
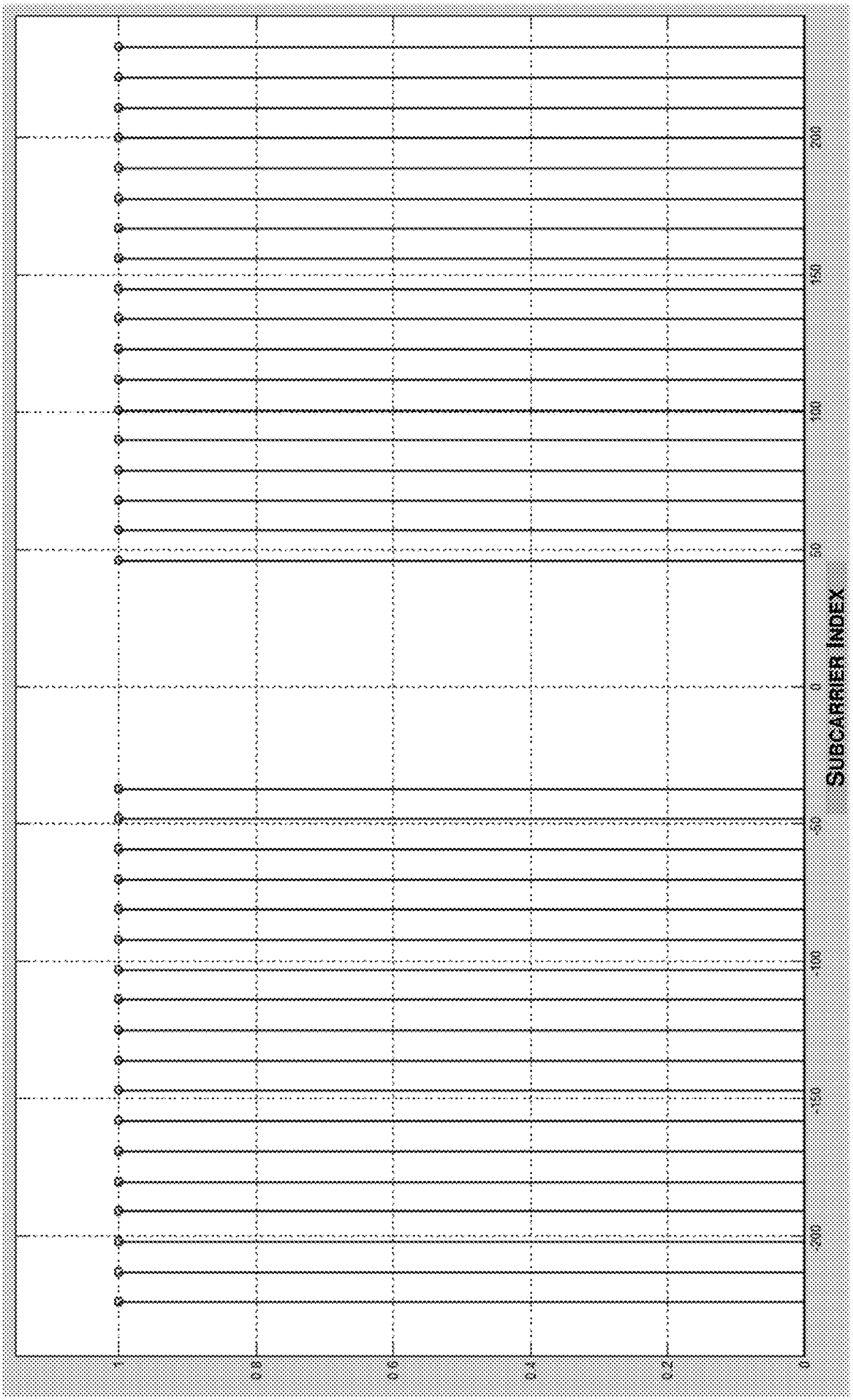
FIG. 10 is a diagram of an example simulation under a proposed scheme in accordance with the present disclosure.

FIG. 10 illustrates an example simulation 1000 of overall pilot tones for dRU on BW40. Referring to FIG. 10, the minimum pilot tone separation may be 11 tones with perfect uniform distribution.

FIG. 11 illustrates an example scenario 1100 under a proposed scheme in accordance with the present disclosure. Scenario 1100 may pertain to pilot tone optimization for dRU52 on BW40. Part (A) of FIG. 11 shows a first option (Option-1) in which the two pilot tones (first and second pilot tones) on the left side of each of eight dRU52s may be shifted to the right by 18 while the two pilot tones (third and fourth pilot tones) on the right side of each of the eight dRU52s may be kept unchanged. Part (B) of FIG. 11 shows a second option (Option-2) in which the two pilot tones (first and second pilot tones) on the left side of each of eight dRU52s may be kept unchanged while the two pilot tones (third and fourth pilot tones) on the right side of each of the eight dRU52s may be shifted to the right by 18. Between the two options, Option-2 may be preferred. Each of the second, third and fourth pilot tones of each of the eight dRU52s may end up having a pilot tone spacing of 99, 270 and 369 from the first pilot tone, respectively. The corresponding ratio of pilot tone spacing/null spacing=3.09375, 8.4375 and 11.53125, respectively.

FIG. 12 illustrates an example scenario 1200 under a proposed scheme in accordance with the present disclosure. Scenario 1200 may pertain to pilot tone optimization for dRU106 on BW40. Parts (A1), (A2) and (A3) of FIG. 12 shows first, second and third variations of a first option (Option-1a, Option-1b and Option-1c) in which each of the first, second, third and fourth pilot tones of each of four dRU106s may be kept unchanged or shifted to the left or right by a respective number of tones. Parts (B1), (B2) and (B3) of FIG. 12 shows first, second and third variations of a second option (Option-2a, Option-2b and Option-2c) in which each of the first, second, third and fourth pilot tones of each of four dRU106s may be kept unchanged or shifted to the left or right by a respective number of tones.

Under a proposed scheme in accordance with the present disclosure with respect to pilot tone optimization for dRU242 on BW40, each dRU242 may have 8 pilot tones. Under the proposed scheme, the pilot tones of a first dRU242=[$1^{st}$ dRU106 pilot tones, $2^{nd}$ dRU106 pilot tones]. Moreover, the pilot tones of a second dRU242=[$3^{rd}$ dRU106 pilot tones, $4^{th}$ dRU106 pilot tones].

Illustrative Implementations

Figure 13:
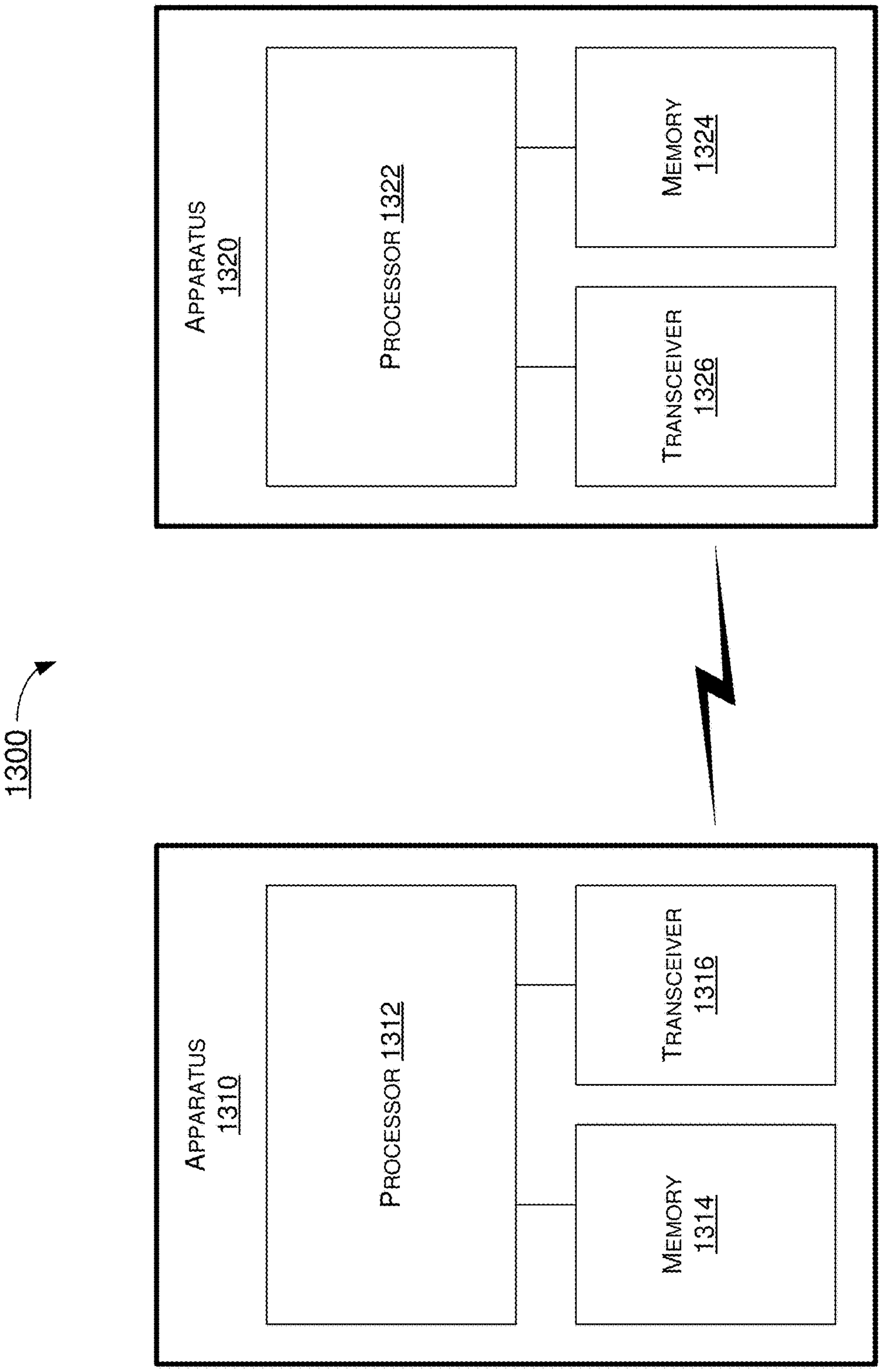
FIG. 13 is a block diagram of an example communication system in accordance with an implementation of the present disclosure.

FIG. 13 illustrates an example system 1300 having at least an example apparatus 1310 and an example apparatus 1320 in accordance with an implementation of the present disclosure. Each of apparatus 1310 and apparatus 1320 may perform various functions to implement schemes, techniques, processes and methods described herein pertaining to optimization of dRU pilot tone designs in wireless communications, including the various schemes described above with respect to various proposed designs, concepts, schemes, systems and methods described above as well as processes described below. For instance, apparatus 1310 may be implemented in STA 110 and apparatus 1320 may be implemented in STA 120, or vice versa.

Each of apparatus 1310 and apparatus 1320 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 1310 and apparatus 1320 may be implemented in a smartphone, a smart watch, a personal digital assistant, a digital camera, or a computing equipment such as a tablet computer, a laptop computer or a notebook computer. Each of apparatus 1310 and apparatus 1320 may also be a part of a machine type apparatus, which may be an loT apparatus such as an immobile or a stationary apparatus, a home apparatus, a wire communication apparatus or a computing apparatus. For instance, each of apparatus 1310 and apparatus 1320 may be implemented in a smart thermostat, a smart fridge, a smart door lock, a wireless speaker or a home control center. When implemented in or as a network apparatus, apparatus 1310 and/or apparatus 1320 may be implemented in a network node, such as an AP in a WLAN.

In some implementations, each of apparatus 1310 and apparatus 1320 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1310 and apparatus 1320 may be implemented in or as a STA or an AP. Each of apparatus 1310 and apparatus 1320 may include at least some of those components shown in FIG. 13 such as a processor 1312 and a processor 1322, respectively, for example. Each of apparatus 1310 and apparatus 1320 may further include one or more other components not pertinent to the proposed scheme of the present disclosure (e.g., internal power supply, display device and/or user interface device), and, thus, such component(s) of apparatus 1310 and apparatus 1320 are neither shown in FIG. 13 nor described below in the interest of simplicity and brevity.

In one aspect, each of processor 1312 and processor 1322 may be implemented in the form of one or more single-core processors, one or more multi-core processors, one or more RISC processors or one or more CISC processors. That is, even though a singular term “a processor” is used herein to refer to processor 1312 and processor 1322, each of processor 1312 and processor 1322 may include multiple processors in some implementations and a single processor in other implementations in accordance with the present disclosure. In another aspect, each of processor 1312 and processor 1322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1312 and processor 1322 is a special-purpose machine specifically designed, arranged and configured to perform specific tasks including those pertaining to optimization of dRU pilot tone designs in wireless communications in accordance with various implementations of the present disclosure.

In some implementations, apparatus 1310 may also include a transceiver 1316 coupled to processor 1312. Transceiver 1316 may include a transmitter capable of wirelessly transmitting and a receiver capable of wirelessly receiving data. In some implementations, apparatus 1320 may also include a transceiver 1326 coupled to processor 1322. Transceiver 1326 may include a transmitter capable of wirelessly transmitting and a receiver capable of wirelessly receiving data. It is noteworthy that, although transceiver 1316 and transceiver 1326 are illustrated as being external to and separate from processor 1312 and processor 1322, respectively, in some implementations, transceiver 1316 may be an integral part of processor 1312 as a system on chip (SoC), and transceiver 1326 may be an integral part of processor 1322 as a SoC.

In some implementations, apparatus 1310 may further include a memory 1314 coupled to processor 1312 and capable of being accessed by processor 1312 and storing data therein. In some implementations, apparatus 1320 may further include a memory 1324 coupled to processor 1322 and capable of being accessed by processor 1322 and storing data therein. Each of memory 1314 and memory 1324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1314 and memory 1324 may include a type of read-only memory (ROM) such as mask ROM, programmable ROM (PROM), erasable programmable ROM (EPROM) and/or electrically erasable programmable ROM (EEPROM). Alternatively, or additionally, each of memory 1314 and memory 1324 may include a type of non-volatile random-access memory (NVRAM) such as flash memory, solid-state memory, ferroelectric RAM (FeRAM), magnetoresistive RAM (MRAM) and/or phase-change memory.

Each of apparatus 1310 and apparatus 1320 may be a communication entity capable of communicating with each other using various proposed schemes in accordance with the present disclosure. For illustrative purposes and without limitation, a description of capabilities of apparatus 1310, as STA 110, and apparatus 1320, as STA 120, is provided below in the context of example process 1400. It is noteworthy that, although a detailed description of capabilities, functionalities and/or technical features of one of apparatus 1310 and apparatus 1320 is provided below, the same may be applied to the other of apparatus 1310 and apparatus 1320 although a detailed description thereof is not provided solely in the interest of brevity. It is also noteworthy that, although the example implementations described below are provided in the context of WLAN, the same may be implemented in other types of networks.

Illustrative Processes

Figure 14:
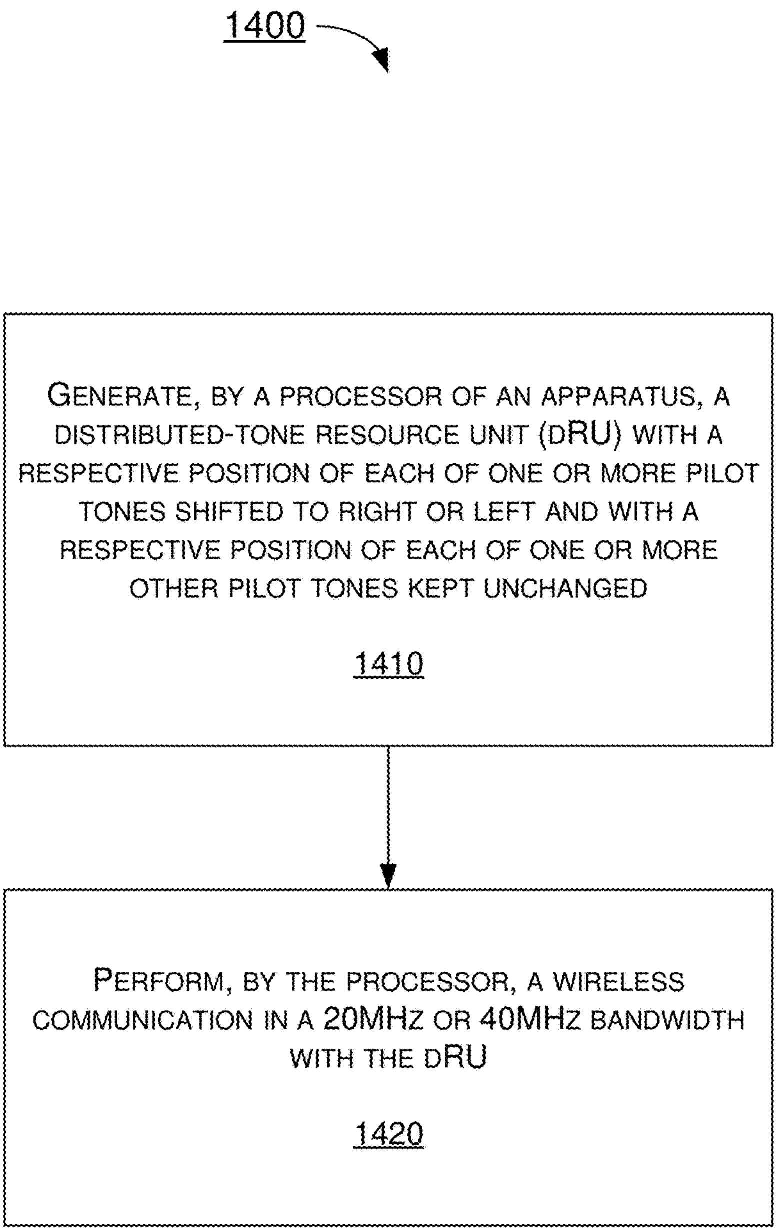
FIG. 14 is a flowchart of an example process in accordance with an implementation of the present disclosure.

FIG. 14 illustrates an example process 1400 in accordance with an implementation of the present disclosure. Process 1400 may represent an aspect of implementing various proposed designs, concepts, schemes, systems and methods described above. More specifically, process 1400 may represent an aspect of the proposed concepts and schemes pertaining to optimization of dRU pilot tone designs in wireless communications in accordance with the present disclosure. Process 1400 may include one or more operations, actions, or functions as illustrated by one or more of blocks 1410 and 1420. Although illustrated as discrete blocks, various blocks of process 1400 may be divided into additional blocks, combined into fewer blocks, or eliminated, depending on the desired implementation. Moreover, the blocks/sub-blocks of process 1400 may be executed in the order shown in FIG. 14 or, alternatively, in a different order. Furthermore, one or more of the blocks/sub-blocks of process 1400 may be executed repeatedly or iteratively. Process 1400 may be implemented by or in apparatus 1310 and apparatus 1320 as well as any variations thereof. Solely for illustrative purposes and without limiting the scope, process 1400 is described below in the context of apparatus 1310 implemented in or as STA 110 functioning as a non-AP STA and apparatus 1320 implemented in or as STA 120 functioning as an AP STA of a wireless network such as a WLAN in network environment 100 in accordance with one or more of IEEE 802.11 standards. Process 1400 may begin at block 1410.

At 1410, process 1400 may involve processor 1312 of apparatus 1310 generating a dRU with a respective position of each of one or more pilot tones shifted to right or left and with a respective position of each of one or more other pilot tones kept unchanged. Process 1400 may proceed from 1410 to 1420.

At 1420, process 1400 may involve processor 1312 performing, via transceiver 1316, a wireless communication in a 20 MHz or 40 MHz bandwidth with the dRU.

In some implementations, the respective position of each of one or more pilot tones may be shifted to right or left by n*9 in an event that the wireless communication is performed in the 20 MHz bandwidth. Moreover, the respective position of each of one or more pilot tones may be shifted to right or left by n*18 in an event that the wireless communication is performed in the 40 MHz bandwidth. In such cases, n may be an integer and n≥1.

In some implementations, a ratio of a pilot tone spacing to a CSD periodicity may be closer to x.5 when the respective position of each of one or more pilot tones is shifted compared to the ratio when the respective position of each of one or more pilot tones is not shifted. In such cases, x may be an integer.

In some implementations, in performing the wireless communication in the 20 MHz or 40 MHz bandwidth with the dRU, process 1400 may involve processor 1312 performing the wireless communication in the 20 MHz bandwidth with nine dRU26s, with pilot tone indices of the nine dRU26s as follows:

| | | |
|---|---|---|
| for a first dRU26: | −102 | 15; |
| for a second dRU26: | −80 | 37; |
| for a third dRU26: | −91 | 26; |
| for a fourth dRU26: | −69 | 48; |
| for a fifth dRU26: | −58 | 59; |
| for a sixth dRU26: | −47 | 70; |
| for a seventh dRU26: | −25 | 92; |
| for an eighth dRU26: | −36 | 81; and |
| for a ninth dRU26: | −14 | 103. |

In some implementations, in performing the wireless communication in the 20 MHz or 40 MHz bandwidth with the dRU, process 1400 may involve processor 1312 performing the wireless communication in the 20 MHz bandwidth with four dRU52s, with pilot tone indices of the four dRU52s as follows:

| | | | | |
|---|---|---|---|---|
| for a first dRU52: | −102 | −80 | 15 | 37; |
| for a second dRU52: | −91 | −69 | 26 | 48; |
| for a third dRU52: | −47 | −25 | 70 | 92; and |
| for a fourth dRU52: | −36 | −14 | 81 | 103. |

In some implementations, in performing the wireless communication in the 20 MHz or 40 MHz bandwidth with the dRU, process 1400 may involve processor 1312 performing the wireless communication in the 20 MHz bandwidth with two dRU106s, with pilot tone indices of the two dRU106s as follows:

| | | | | |
|---|---|---|---|---|
| for a first dRU106: | −102 | −69 | 15 | 48; and |
| for a second dRU106: | −47 | −14 | 70 | 103. |

In some implementations, in performing the wireless communication in the 20 MHz or 40 MHz bandwidth with the dRU, process 1400 may involve processor 1312 performing the wireless communication in the 20 MHz bandwidth with two dRU106s, with pilot tone indices of the two dRU106s as follows:

| | | | | |
|---|---|---|---|---|
| for a first dRU106: | −102 | −80 | 26 | 48; and |
| for a second dRU106: | −47 | −25 | 81 | 103. |

In some implementations, in performing the wireless communication in the 20 MHz or 40 MHz bandwidth with the dRU, process 1400 may involve processor 1312 performing the wireless communication in the 20 MHz bandwidth with two dRU106s, with pilot tone indices of the two dRU106s as follows:

| | | | | |
|---|---|---|---|---|
| for a first dRU106: | −91 | −69 | 15 | 37; and |
| for a second dRU106: | −36 | −14 | 70 | 92. |

In some implementations, in performing the wireless communication in the 20 MHz or 40 MHz bandwidth with the dRU, process 1400 may involve processor 1312 performing the wireless communication in the 40 MHz bandwidth with eighteen dRU26s, with pilot tone indices of the eighteen dRU26s as follows:

| | | |
|---|---|---|
| for a first dRU26: | −224 | 46; |
| for a second dRU26: | −125 | 145; |
| for a third dRU26: | −202 | 68; |
| for a fourth dRU26: | −103 | 167; |
| for a fifth dRU26: | −81 | 189; |
| for a sixth dRU26: | −114 | 156; |
| for a seventh dRU26: | −213 | 57; |
| for an eighth dRU26: | −92 | 178; |
| for a ninth dRU26: | −191 | 79; |
| for a tenth dRU26: | −169 | 101; |
| for an eleventh dRU26: | −70 | 200; |
| for a twelfth dRU26: | −147 | 123; |
| for a thirteenth dRU26: | −48 | 222; |
| for a fourteenth dRU26: | −180 | 90; |
| for a fifteenth dRU26: | −59 | 211; |
| for a sixteenth dRU26: | −158 | 112; |
| for a seventeenth dRU26: | −37 | 233; and |
| for an eighteenth dRU26: | −136 | 134. |

In some implementations, in performing the wireless communication in the 20 MHz or 40 MHz bandwidth with the dRU, process 1400 may involve processor 1312 performing the wireless communication in the 40 MHz bandwidth with eight dRU52s, with pilot tone indices of the eight dRU52s as follows:

| | | | | |
|---|---|---|---|---|
| for a first dRU52: | −224 | −125 | 46 | 145; |
| for a second dRU52: | −202 | −103 | 68 | 167; |
| for a third dRU52: | −213 | −114 | 57 | 156; |
| for a fourth dRU52: | −191 | −92 | 79 | 178; |
| for a fifth dRU52: | −169 | −70 | 101 | 200; |
| for a sixth dRU52: | −147 | −48 | 123 | 222; |
| for a seventh dRU52: | −158 | −59 | 112 | 211; and |
| for an eighth dRU52: | −136 | −37 | 134 | 233. |

In some implementations, in performing the wireless communication in the 20 MHz or 40 MHz bandwidth with the dRU, process 1400 may involve processor 1312 performing the wireless communication in the 40 MHz bandwidth with four dRU106s, with pilot tone indices of the four dRU106s as follows:

| | | | | |
|---|---|---|---|---|
| for a first dRU106: | −202 | −125 | 68 | 145; |
| for a second dRU106: | −191 | −114 | 79 | 156; |
| for a third dRU106: | −147 | −70 | 123 | 200; and |
| for a fourth dRU106: | −136 | −59 | 134 | 211. |

In some implementations, in performing the wireless communication in the 20 MHz or 40 MHz bandwidth with the dRU, process 1400 may involve processor 1312 performing the wireless communication in the 40 MHz bandwidth with four dRU106s, with pilot tone indices of the four dRU106s as follows:

| | | | | |
|---|---|---|---|---|
| for a first dRU106: | −224 | −103 | 46 | 167; |
| for a second dRU106: | −213 | −92 | 57 | 178; |
| for a third dRU106: | −169 | −48 | 101 | 222; and |
| for a fourth dRU106: | −158 | −37 | 112 | 233. |

In some implementations, in performing the wireless communication in the 20 MHz or 40 MHz bandwidth with the dRU, process 1400 may involve processor 1312 performing the wireless communication in the 40 MHz bandwidth with two dRU242s. In such cases, pilot tone of a first dRU242 of the two dRU242s may include: [pilot tones of a first dRU106, pilot tones of a second dRU106], and pilot tone of a second dRU242 of the two dRU242s may include: [pilot tones of a third dRU106, pilot tones of a fourth dRU106].

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating, by a processor of an apparatus, a distributed-tone resource unit (dRU) with a respective position of each of one or more pilot tones shifted with a respective position of each of one or more other pilot tones kept unchanged; and performing, by the processor, a wireless communication in a 20 MHz or 40 MHz bandwidth with the dRU, wherein the performing of the wireless communication in the 20 MHz or 40 MHz bandwidth with the dRU comprises performing the wireless communication in the 40 MHz bandwidth with eighteen 26-tone dRUs (dRU26s), eight 52-tone dRUs (dRU52s), or four 106-tone dRUs (dRU106s), wherein pilot tone indices of the eighteen dRU26s comprise at least:

| | |
|---|---|
| for a first dRU26: | −224; |
| for a second dRU26: | −125; |
| for a third dRU26: | −202; |
| for a fourth dRU26: | −103; |
| for a fifth dRU26: | −81; |
| for a sixth dRU26: | −114; |
| for a seventh dRU26: | −213; |
| for an eighth dRU26: | −92; |
| for a ninth dRU26: | −191; |
| for a tenth dRU26: | −169; |
| for an eleventh dRU26: | −70; |
| for a twelfth dRU26: | −147; |
| for a thirteenth dRU26: | −48 |
| for a fourteenth dRU26: | −180; |
| for a fifteenth dRU26: | −59; |
| for a sixteenth dRU26: | −158; |
| for a seventeenth dRU26: | −37; and |
| for an eighteenth dRU26: | −136, |

wherein pilot tone indices of the eight dRU52s comprise at least:

| | | |
|---|---|---|
| for a first dRU52: | −224 | −125; |
| for a second dRU52: | −202 | −103; |
| for a third dRU52: | −213 | −114; |
| for a fourth dRU52: | −191 | −92; |
| for a fifth dRU52: | −169 | −70; |
| for a sixth dRU52: | −147 | −48; |
| for a seventh dRU52: | −158 | −59; and |
| for an eighth dRU52: | −136 | −37, |

wherein pilot tone indices of the four dRU106s comprise at least:

| | | |
|---|---|---|
| for a first dRU106: | −224 | −103; |
| for a second dRU106: | −213 | −92; |
| for a third dRU106: | −169 | −48; and |
| for a fourth dRU106: | −158 | −37. |

wherein a ratio of a pilot tone spacing to a cyclic shift delay (CSD) periodicity is closer to x.5 when the respective position of each of one or more pilot tones is shifted compared to the ratio when the respective position of each of one or more pilot tones is not shifted, and wherein x is an integer.

2. The method of claim 1, wherein:

the respective position of each of one or more pilot tones is shifted by n*9 in an event that the wireless communication is performed in the 20 MHz bandwidth, the respective position of each of one or more pilot tones is shifted by n*18 in an event that the wireless communication is performed in the 40 MHz bandwidth, and n is an integer and n≥1.

3. An apparatus, comprising:

a transceiver configured to communicate wirelessly; and a processor coupled to the transceiver and configured to perform operations comprising:

generating a distributed-tone resource unit (dRU) with a respective position of each of one or more pilot tones shifted with a respective position of each of one or more other pilot tones kept unchanged; and performing, via the transceiver, a wireless communication in a 20 MHz or 40 MHz bandwidth with the dRU, wherein the performing of the wireless communication in the 20 MHz or 40 MHz bandwidth with the dRU comprises performing the wireless communication in the 40 MHz bandwidth with eighteen 26-tone dRUs (dRU26s), eight 52-tone dRUs (dRU52s), or four 106-tone dRUs (dRU106s), wherein pilot tone indices of the eighteen dRU26s comprise at least:

| | |
|---|---|
| for a first dRU26: | −224; |
| for a second dRU26: | −125; |
| for a third dRU26: | −202; |
| for a fourth dRU26: | −103; |
| for a fifth dRU26: | −81; |
| for a sixth dRU26: | −114; |
| for a seventh dRU26: | −213; |
| for an eighth dRU26: | −92; |
| for a ninth dRU26: | −191; |
| for a tenth dRU26: | −169; |
| for an eleventh dRU26: | −70; |
| for a twelfth dRU26: | −147; |
| for a thirteenth dRU26: | −48; |
| for a fourteenth dRU26: | −180; |
| for a fifteenth dRU26: | −59; |
| for a sixteenth dRU26: | −158; |
| for a seventeenth dRU26: | −37; and |
| for an eighteenth dRU26: | −136, |

wherein pilot tone indices of the eight dRU52s comprise at least:

| | | |
|---|---|---|
| for a first dRU52: | −224 | −125; |
| for a second dRU52: | −202 | −103; |
| for a third dRU52: | −213 | −114; |
| for a fourth dRU52: | −191 | −92; |
| for a fifth dRU52: | −169 | −70; |
| for a sixth dRU52: | −147 | −48; |
| for a seventh dRU52: | −158 | −59; and |
| for an eighth dRU52: | −136 | −37, |

wherein pilot tone indices of the four dRU106s comprise at least:

| | | |
|---|---|---|
| for a first dRU106: | −224 | −103; |
| for a second dRU106: | −213 | −92; |
| for a third dRU106: | −169 | −48; and |
| for a fourth dRU106: | −158 | −37. |

wherein a ratio of a pilot tone spacing to a cyclic shift delay (CSD) periodicity is closer to x.5 when the respective position of each of one or more pilot tones is shifted compared to the ratio when the respective position of each of one or more pilot tones is not shifted, and wherein x is an integer.

4. The apparatus of claim 3, wherein:

the respective position of each of one or more pilot tones is shifted by n*9 in an event that the wireless communication is performed in the 20 MHz bandwidth, the respective position of each of one or more pilot tones is shifted by n*18 in an event that the wireless communication is performed in the 40 MHz bandwidth, and n is an integer and n≥1.

* * * * *